Sept. 4, 1951     A. K. BREWER     2,566,308
PROCESS AND APPARATUS FOR THE ELECTROCHEMICAL
SEPARATION OF CHEMICALS BY ION MIGRATION
Filed Feb. 7, 1947

A. K. Brewer     Inventor

By    F. J. Schmitt
          Attorney

Patented Sept. 4, 1951

2,566,308

UNITED STATES PATENT OFFICE 2,566,308

PROCESS AND APPARATUS FOR THE ELECTROCHEMICAL SEPARATION OF CHEMICALS BY ION MIGRATION

Aubrey K. Brewer, Richland Center, Wis.

Application February 7, 1947, Serial No. 726,975

11 Claims. (Cl. 204—180)

(Granted under the act of March 3, 1883, as amended April 30, 1928; 370 O. G. 757)

The present invention relates to a novel method and means for fractionating in solution a mixture of ionic components of like sign. The invention is applicable to and has as its general object the separation of cationic components, or anionic components, provided the components have an appreciable difference in migration velocity or so-called mobility.

It is a well known fact that the mobilities of various ions in aqueous solution are, in general, not the same. Moreover, by practice of this invention, it has been recently discovered that isotope ions of the same element differ in mobility in some instances. In general, it appears that a mobility difference between ions of like charge is due primary to a difference in affinity for water. Ions which carry more water and are in effect larger will migrate, in accordance with Stokes' law, at a slower velocity than ions carrying like charge but less water.

The following table compiled mainly from the International Critical Tables, gives the mobility of various ions in dilute aqueous solutions at 18° C.:

| Cation | Velocity, cm./sec. | Anion | Velocity, cm./sec. |
|---|---|---|---|
| H | $32.4 \times 10^{-4}$ | OH | $18 \times 10^{-4}$ |
| Cs | 6.96 | I | 6.9 |
| K | 6.6 | Br | 6.7 |
| NH$_4$ | 6.7 | Cl | 6.7 |
| Na | 4.5 | F | 4.8 |
| Li | 3.4 | NO$_3$ | 6.3 |
| Ag | 5.6 | C$_2$H$_3$O$_2$ | 3.6 |
| Ra | 6.5 | SO$_4$ | 7.1 |
| Ba | 5.7 | CO$_3$ | 6.2 |
| Pb | 6.3 | | |

The principle underlying this invention was arrived at in the following way: Two groups of ions migrating toward an electrode can be likened to a school of fish of two sizes swimming forward at different speeds. Suppose the mean speed of the smaller fish to be 8 M. P. H. and of the larger fish 4 M. P. H. If a mixture of both kinds is poured into a river flowing at 6 M. P. H. in which the fish attempt to swim upstream, the larger fish will recede downstream at 2 M. P. H. while the smaller fish will progress upstream at 2 M. P. H. Hence the two sizes of fish become separated.

This analogy is not complete for electrolytes because ions do not move toward an electrode at fixed velocities; rather, their motion is a slow forward drift superimposed on their chaotic motion of kinetic agitation. Groups of ions are constantly subjected to remixing by this agitation and also by turbulence and convection of the solution.

According to this invention the ion migration and superimposed counterflow of solution is conducted through a small capillary passage, or a multitude of capillary passages in a porous packing. The advantages gained thereby are two-fold and without which the mechanism set forth in this disclosure becomes inoperative. First, the setting up in the capillary of a balance between the average forward ion transport and the counterflow of electrolyte establishes the conditions of countercurrent reflux whereby the separation, due to the intrinsic differences in mobility above and below average, can be made continuous and multiplied as many fold as desired, resulting in substantially complete separation of ionic substances whose mobilities may differ by only a fraction of one percent. Second, the capillary confinement reduces remixing by turbulence or convection to negligible proportions. Remixing by kinetic agitation is found not to enter the problem until very high concentration gradients are reached. It therefore becomes possible in practising this invention to achieve substantially complete separation by use of only a few centimeters total length of capillary passage.

A further deviation from the fish analogy is encountered when large porous packings are used, giving rise to a further feature of this invention. Large packings carrying an appreciable ion current will become much hotter in their interiors relative to their boundaries, and will have a large temperature gradient at right angles to the direction of current. Since the ratio of fluidity to ionic conductance for aqueous solutions is not strictly independent of temperature, it becomes impossible to establish an exact counterflow balance over the entire flow cross-section of such packings. The balance exists only at some mean position in the cross-section intermediate to the temperature extremes. This impairs the separation efficiency. The present invention overcomes this effect by the use, when necessary, of a plurality of short packings, such as frits or diaphragms, of from 0.5 to 1.5 centimeters thickness, placed parallel or concentric to one another and providing cooling and mixing chambers therebetween. In this manner the packings are face-cooled and the lateral temperature gradients are very slight.

One measure of over-all separation for a capillary path between anolyte and catholyte is defined as $(C_1/C_2)$ cathode divided by $(C_1/C_2)$ anode, where C refers to ion concentration and subscripts 1 and 2 the fast and slow cations respectively. When this quotient is unity there is no separation.

A theoretical unit of length $h$, may be defined such that, when the separation has reached equilibrium, the abundance ratio $C_1/C_2$ increases along this unit length by the factor $E$, where $E$ is defined as the relative mobility, $X_1/X_2$. It then follows for a total length of capillary $l$, that $$(C_1/C_2) \text{ cathode} // (C_1/C_2) \text{ anode} = (X_1/X_2)^{l/h}$$

It has been determined that a capillary diaphragm or frit can be constructed in which the unit, $h$, is about 0.02 cm. A diaphragm 0.5 centimeter thick therefore contains 25 units. If two such diaphragms are used, and a solution of equimolar NaCl and LiCl is fed between them, then, since $X_1/X_2 = 1.3$ for sodium and lithium as seen in the above table, $$C_1/C_2 \text{ anode} = (1.3)^{25} = 700$$

and $$(C_1/C_2) \text{ cathode} = \frac{1}{(1.3)^{25}} = .0014$$

The catholyte therefore contains nearly pure sodium solution (99.86% Na) and the anolyte nearly pure lithium solution (99.86% Li). This assumes that rates of take-off are small and do not reduce the separation efficiency of the counterflow process. In general, where nearly pure ion products are desired, the take-off velocity for one ion product must not be so large as to reverse the direction of flow of the other ion product. Analytically stated, the take-off velocity of one pure ion component must be less than the difference between the unimpeded migration velocity of both components.

The primary object of the invention is the separation of ion components in the foregoing manner. Specific objects of the invention include the separation of ionic components in continuous fashion, on a large scale, with minimum power consumption based on yield of product, and by means of apparatus which is readily assembled, disassembled, and repaired. Other objects will be apparent from the accompanying drawings and detailed description.

Figure 1:
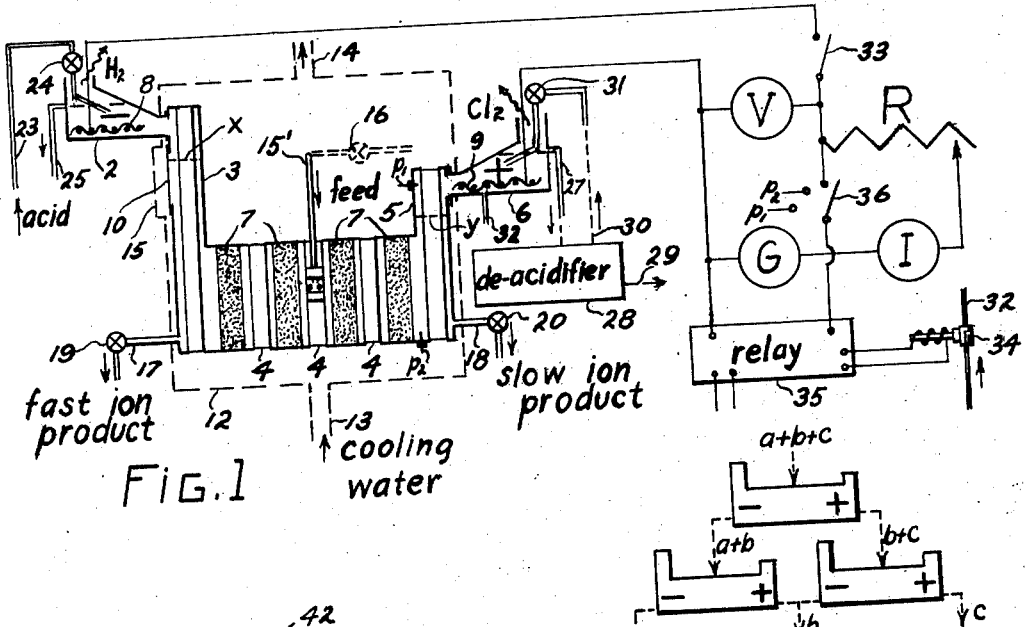
Fig. 1 is a diagram illustrating one form of the apparatus and the system connections therefor.

Referring to the system shown in Fig. 1, the fractionating device proper comprises the catholyte chamber 2, the catholyte riser 3, three intermediate cooling and mixing chambers 4, the anolyte riser 5 and the anolyte chamber 6. These, together with capillary frits 7 are assembled to form a conductive path between the platinum gauze cathode 8 and anode 9 such that the capillary paths are interrupted at intervals by cooling and mixing spaces. The catholyte riser has a window 10.

An outer housing 12 surrounds most of the device and is arranged to confine a flow of cooling water from inlet 13 through the cooling chambers 4 to the outlet 14. This housing has a window 15 opposite the window 10 of the catholyte riser.

The electrolyte to be fractionated is supplied to an intermediate, not necessarily central, cooling and mixing chamber 4 from the feed line 15', under control of the metering valve 16. The feed connection is conveniently made through a perforated cooling tube provided with rubber stoppers as shown. Outlets 17 and 18 for the separated products are provided in the catholyte and anolyte risers; these are controlled by metering valves 19 and 20.

The catholyte chamber 2 is provided with an acid supply line 23 having a metering valve 24. A return line 25 serves to maintain a constant acid level in the catholyte chamber.

The anolyte chamber 6 is provided with an overflow outlet 27 leading to a de-acidifier 28. The latter has an outlet 29 for the excess acid and water and an outlet 30 for neutral electrolyte leading through valve 31 back to the anolyte. An alternative inlet line for flushing the anolyte chamber is shown at 32.

The electrical circuit includes the direct current generator G connected to the electrodes through ammeter I, adjustable resistor R, and manual switch 33. A voltmeter V measures the potential drop of the fractionating device.

For flushing the anolyte chamber the line 32 is controlled by a valve 34 which is modulated by an electronic relay device 35. The relay opens the valve in response to a drop in potential across a selected part of the fractionating path as cut in by the selector switch 36. The latter includes contacts which may be connected to probes $B_1$ and $B_2$ at spaced points along the fractionating path.

Since resistance of the electrolyte has a negative temperature coefficient, it is desirable that the resistor R have a positive coefficient in order that the current supply will reach a stable value when the device reaches operating temperature.

Operation of the system illustrated in Fig. 1, with the relay 35 disconnected, is as follows: All valves are initially closed and switch 33 open. An electrolyte mixture, for example, a neutral 0.1 normal solution of RbCl+NaCl is introduced through valve 16 until overflow at 27 begins. Valve 16 is then closed. A solution of HCl, for example 0.2 normal, is supplied through valve 24, overflowing at 25. This establishes a difference in level between catholyte and anolyte and the solution begins to flow slowly through the frits 7. Immediately after the system is thus filled, the switch 33 is closed and voltage V adjusted by the resistor R to a value such that the voltage drop per cm of frit times the mean mobility of $Rb^+ + Na^+$ approximates the liquid countervelocity.

The system now begins its starting or induction period during which the $Rb^+$ and $Na^+$ are to be transported in opposite directions until complete separation occurs. Counterflow water and $Cl^-$ ions flow from cathode to anode, the $Cl^-$ ions carrying substantially all of the net current. Hydrogen is liberated at the cathode, one molecule for 2 $Cl^-$ ions of current. Chlorine is liberated at the anode, one atom for each $Cl^-$ ion arriving. Normally, a slight flow of $H^+$ ions to the cathode and $OH^-$ ions to the anode occurs but can be disregarded when the anolyte is kept substantially neutral. Some of the chlorine atoms liberated at the anode react with water to form HCl and HClO. It is necessary to prevent large acid accumulation at the anode for otherwise the $H^+$ ion current becomes excessive and power is wasted. To this end the solution overflowing at 27 is treated to remove acids and counterflow water via the waste outlet 29 and the neutral NaCl returned to the anolyte through valve 31.

The H+ ions in the acid at the cathode end tend to separate from the Rb+ ions due to higher mobility of the former and a more or less diffuse boundary forms at X. The boundary can be seen through window 10 with the aid of a pH sensitive dye in the solution or by reason of the difference in refractive index. V is now adjusted by change of R so that the boundary level X remains fixed. The mean migration velocity of the Rb++Na+ is thus kept equal to the countercurrent velocity and fractionation continues. After a time, with continued adjustment to hold the boundary X at fixed position, the Rb+ is at the left and the Na+ to the right of the feed inlet chamber.

The system is now ready for continuous separation. Valve 18 is opened to feed the mixture at a rate which is sufficiently slow as not to send Na+ toward the cathode. The valves 19 and 20 are opened sufficient to remove solutions of the products Rb+ and Na+ at the rates and in the proportions in which they are fed.

Since the slow ion product in the foregoing example is NaCl and has inconsequential monetary value, the use of the flushing control for the anolyte would be desirable. In this case the line 32 communicates with a supply of 0.1 normal NaCl or a weak NaOH solution. The valve 31 is closed and the overflow 27 connected to waste. Excessive acidity in the anolyte causes a decrease in V; relay 35 responds to open 34 and flush out or neutralize the acid.

If a pair of ions such as Rb+ and Cs+ are being fractionated, both fast compared with Na+, then the use of NaCl or NaOH as an anolyte flushing or neutralizing agent will result in occurrence of a more or less diffuse boundary indicated at Y the stable position of which, together with boundary X, can be used to indicate the proper maintenance of counterflow water and also the equality between the feed and product rates.

Figure 2:
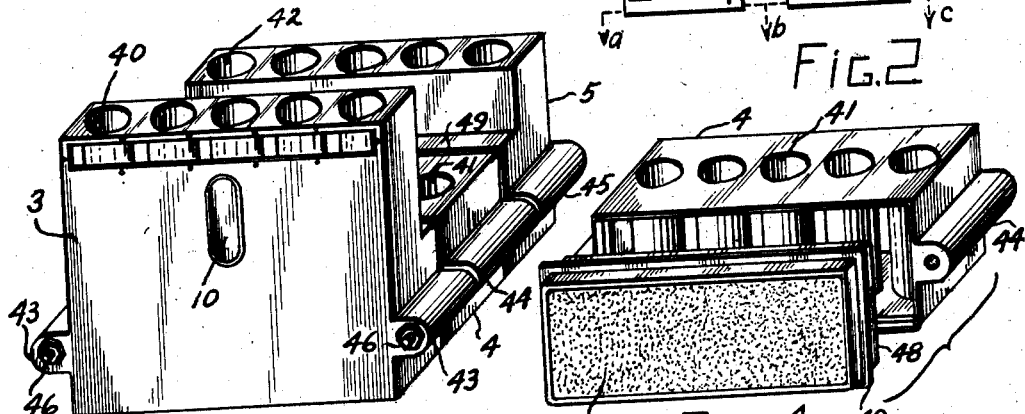
Fig. 2 is a flow diagram illustrating the separation of a three component mixture.

If a mixture of three ions a, b and c which are slow, intermediate, and fast, for example Li+, Na+, K+, are to be isolated, the three stage arrangement shown in Fig. 2 may be used. The feed of the three components is introduced to a first stage. The binary products of the first stage are introduced to two other stages as indicated.

It will be understood that the acid supplied to the catholyte must supply the same anion as that present in the salt solution. Thus, sulfuric acid is used for fractionation of sulfates, nitric acid for nitrates, etc. Also it will be understood that where the feed contains a mixture of a rare and an abundant component, the feed inlet can be located closer to the product outlet of the abundant component.

Figure 3:
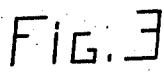
Fig. 3 is a perspective view of a double diaphragm apparatus omitting the system connections and the electrode compartments.
Figure 4:
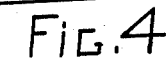
Fig. 4 is a perspective view of an intermediate unit of the apparatus.

Referring to Figs. 3 and 4, the cathode riser 3 and anode riser 5 are shown associated with a single intermediate cooling and mixing chamber 4. The several casings are constructed of a molded plastic. They may be constructed of cast iron coated with vitreous enamel. Integral with the cathode riser 3, the intermediate chamber 4, and anode riser 5, are the respective cooling tubes 40, 41 and 42. The casings with the frits 7 between them are clamped together by means of the lugs 43, 44, 45 and tie rods 46. Fig. 4 shows a frit 7 surrounded by a rubber frame 48 preferably vulcanized to the edges of the frit. The frame has a flange 49 adapted to be clamped in sealing relation between adjacent edges of each pair of casing sections. The catholyte and anolyte chambers, not shown in Fig. 4, are fastened to the respective risers with rubber gaskets.

The frit may be constructed by sintering under pressure a suitable granular powder and binder where necessary. Fritted plates of glass beads of from 50 to 200 mesh per inch are suitable. Fibrous material, such as cotton and asbestos, with a suitable binder, may also be used. The constructions are well known in the filtration art and do not require elaboration. However, certain dimensions have been found optimum for the present purpose. The thickness should lie between .5 and 1.5 cm. and should be uniform. The granular or fibrous material should be thoroughly mixed and care taken in the molding to achieve uniform porosity. The mean pore diameter should lie within the range .02 to .002 cm. The edges should be tightly sealed to the supporting frame to preclude channeling.

Figure 5:
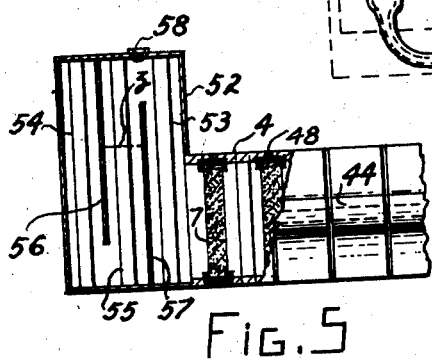
Fig. 5 is a view in elevation and partial section showing a modified form of the apparatus.

In Fig. 5 a modified riser 52 is illustrated and comprises three rows of cooling tubes 53, 54 and 55 between which are two baffles 56 and 57. The construction provides a gooseneck path for the catholyte and is used to provide a stable boundary, indicated at Z, for those instances in which the density of the catholyte acid solution is greater than the density of the salt solution. A plug 58 is provided to relieve trapped air during the filling operation.

Figure 6:
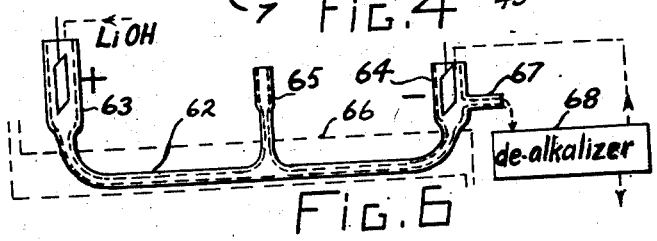
Fig. 6 is a view in elevation of a further modification.

While the devices of Figs. 1 to 5 have been described with reference to the fractionation of cations, it will be understood that if the potential is reversed and the acid feed replaced by alkali feed, the same equipment may be used to fractionate anions of different mobilities. Fig. 6 illustrates a modification for anion fractionation. A glass capillary 62 of from 0.005 to 0.10 cm. I. D. is provided with an anolyte riser 63, a catholyte riser 64, and an intermediate feed riser 65. The capillary is encased by suitable means 66 for cooling. A mixture of lithium acetate and citrate for example, is fed to 65. Lithium hydroxide solution is fed to 63 to balance the mean migration velocity of the acetate and citrate ions. The current is carried by Li+ which becomes LiOH on arrival at the cathode. This overflows with the excess water at 67, and enters de-alkalizer 68 which removes LiOH for re-use at the anode. Any acetate present in the overflow may be returned to the catholyte. The solution undergoing fractionation may be fed and sampled at intervals with a hypodermic syringe. After an induction period the fast ion (citrate) can be taken from the anolyte riser substantially free of acetate.

Having thus disclosed a new method of fractionation and apparatus with which it may be practiced, I desire to secure by Letters Patent all variations falling within the spirit of the invention as defined in the appended claims.

The invention described herein may be manufactured and used by or for the Government of the United States of America for governmental purposes without the payment of any royalties thereon or therefor.

I claim:

1. The process of fractionating a mixture of ions of like sign in an electrolyte through means of a capillary passage which comprises: feeding the electrolyte to a capillary passage of substantial length, applying an electric current of sufficient potential longitudinally of the passage to cause migration of the ions at an average velocity, and feeding a solution against the direction of said ion migration at a velocity substantially equal to said average velocity.

2. The process of claim 1, and the step of withdrawing from adjacent the upstream end of said passage a product enriched in fast ions.

3. The process of claim 1, and the step of withdrawing from adjacent the downstream end of said passage a product enriched in slow ions.

4. The process of claim 1, and the step of removing the heat generated in the passage to reduce the transverse temperature gradient therein approximately to zero.

5. In a device for fractionating an electrolyte mixture of ionic components having like charge but unlike mobilities, in combination: an anolyte chamber, a catholyte chamber, a fractionating duct connecting said chambers, said fractionating duct having a plurality of spaced capillary partitions of substantial thickness therein, a cathode in said catholyte chamber, an anode in said anolyte chamber, a source of potential connected across said electrodes operative to cause a unidirectional migration of said ionic components through said partitions, and means for producing a unidirectional flow of solution through said duct and partitions in a direction opposite to that of said components and at a velocity substantially equal, numerically, to the average unimpeded migration velocity of said components, and means for cooling the faces of said partitions.

6. The device of claim 5 and means for feeding a mixture of said components intermediate a pair of said partitions.

7. The device of claim 5 and means for withdrawing a fast ion product adjacent the upstream end of said duct.

8. The device of claim 5 and means for withdrawing a slow ion product adjacent the downstream end of said duct.

9. A fractionating device for electrolytes comprising a plurality of casings: means fastening the casings together to form a duct, spaced porous capillary partitions of substantial thickness in said duct, cooling means adjacent the faces of each partition, and means forming a catholyte chamber and an anolyte chamber adjacent the endmost partitions, respectively.

10. The device of claim 9 wherein the pore diameter of said partitions lies in the range .02 to .002 cm. and the partition thickness in the range 0.5 to 1.5 cm.

11. A fractionating device for electrolytes comprising an anolyte chamber, a catholyte chamber, and an elongated capillary passage connecting said chambers, means for introducing a substantially neutral electrolyte mixture intermediate the ends of said capillary passage, electropotential means for causing ion migration through said passage, means for introducing a solution at one end of said capillary path at a rate sufficient to balance the average velocity of migration of the ions of one sign of said electrolyte mixture, and means for introducing a neutralizing mixture for maintaining the electrolyte mixture neutral.

AUBREY K. BREWER.

REFERENCES CITED

The following references are of record in the file of this patent:

UNITED STATES PATENTS

| Number | Name | Date |
|---|---|---|
| 1,603,298 | Speed | Oct. 19, 1926 |
| 1,986,920 | Cross | Jan. 8, 1935 |
| 2,017,049 | Jones | Oct. 15, 1935 |
| 2,251,083 | Theorell | July 29, 1941 |

OTHER REFERENCES

Kendall et al., "The Separation of Isotopes," Proc. National Academy Science, volume 9, 1923, pages 75–78.

Tiselius, "Electrophoretic Analysis of Normal and Immune Sera," Biochemical Journal, volume 31, 1937, part 2, pages 1464–1477.

J. A. V. Butler, "Electrocapillarity," published 1941, by Chemical Publishing Company, New York (p. 96).